United States Patent

[11] 3,581,186

[72] Inventor Aaron David Weinberger
Chicago, Ill.
[21] Appl. No. 808,622
[22] Filed Mar. 19, 1969
[45] Patented May 25, 1971
[73] Assignee Motorola, Inc.
Franklin Park, Ill.

[54] REDUCED FORWARD VOLTAGE DROP RECTIFYING CIRCUIT
5 Claims, 4 Drawing Figs.

[52] U.S. Cl. .......... 321/43, 321/47
[51] Int. Cl. .......... H02m 7/12
[50] Field of Search .......... 321/43, 45, 47, 8

[56] References Cited

UNITED STATES PATENTS

| | | | |
|---|---|---|---|
| 2,898,476 | 8/1959 | Jensen | 321/43X |
| 2,953,738 | 9/1960 | Bright | 321/47 |
| 3,012,182 | 12/1961 | Ford | 321/47 |
| 3,083,328 | 3/1963 | Mallery et al. | 321/47X |

FOREIGN PATENTS

| | | | |
|---|---|---|---|
| 176,133 | 8/1961 | Sweden | 321/47 |
| 851,375 | 10/1960 | Great Britain | 321/43 |

OTHER REFERENCES

RCA Technical Notes, " High Efficiency Low Voltage Rectifier", RCA TN 627, August, 1965, 321/8

*Primary Examiner*—William M. Shoop, Jr.
*Attorney*—Mueller, & Aichele

ABSTRACT: A dynamic rectifying device uses a transistor biased to saturation as the rectifying element. The lower voltage drop between collector and emitter of a saturated transistor (as compared with the diode voltage drop) provides increased rectifying efficiency and better clamping action. The circuit includes a bias network using the input alternating current signal to develop the proper bias voltage for the circuit.

PATENTED MAY 25 1971 3,581,186

Inventor
AARON DAVID WEINBERGER
BY Mueller, Aichele and Rauner
ATTYS.

REDUCED FORWARD VOLTAGE DROP RECTIFYING CIRCUIT

BACKGROUND OF THE INVENTION

The rectifying junctions of semiconductor elements have been used as dynamic clamps or dynamic rectifying elements. For example, transistors having the base and collector electrodes coupled together have been used as diodes. However, the rectifying junction thus formed has a relatively large voltage drop which may, for example, be of the order of 0.7 volts in a silicon transistor. In many circuits this voltage drop would not be of importance, particularly where the circuit was operating with a relatively high power supply voltage. However, in circuits operating from power supplies of from 1.5 to 3 volts, for example, the 0.7 volt diode drop is an appreciable percentage of the power supply voltage and thus it is of great importance to minimize this drop.

It is known that the voltage drop between the collector and emitter of a transistor biased to saturation is much less than the base-emitter voltage drop so that transistors biased to saturation have been used as rectifying or clamping elements. For example, in a silicon transistor biased to saturation the collector-emitter voltage drop may be less than 0.2 volts. However, in order to bias a transistor to saturation it is necessary that the base voltage be greater than either the emitter or collector voltage, a condition which is not normally present in transistor circuits. Circuits have been designed which provide for such a bias but the circuits have required extra power supplies or relatively complicated connections from existing power supplies in order to provide the required saturation bias.

SUMMARY OF THE INVENTION

It is, therefore, an object of this invention to provide an improved circuit using a transistor biased to saturation as a rectifying or clamping element.

Another object of this invention is to provide a clamping or rectifying circuit using a transistor biased to saturation by the signal which is clamped or rectified.

In practicing this invention a rectifying or clamping device is provided in which the emitter and collector electrodes of the transistor are connected across the input terminals. A bias circuit is connected across the input terminals and to the base of the transistor to provide a bias at the base sufficient to bias the transistor to saturation. The bias circuit includes a transformer having a step-up winding to provide a potential at the base of the transistor greater than the potentials at either the collector or emitter. The rectifying or clamping devices may be combined to form a power rectifier.

The invention is illustrated in the drawings of which:

DESCRIPTION OF THE INVENTION

Figure 1:
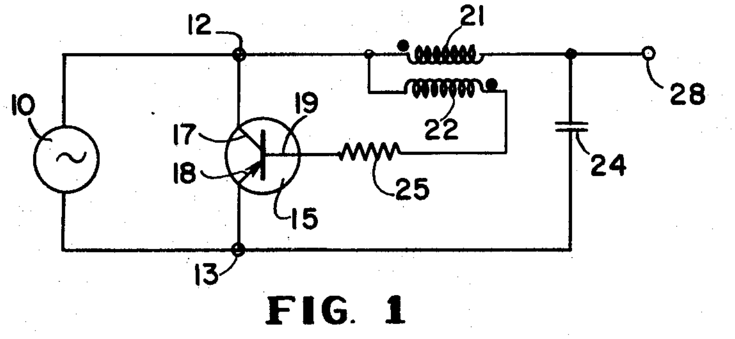
FIG. 1 is a schematic of one embodiment of the invention.

Referring to FIG. 1, an alternating current source 10 supplies alternating current to input terminals 12 and 13 of the rectifying or clamping circuit. Transistor 15, connected between terminals 12 and 13, provides the rectifying action. With transistor 15 biased to conduction, current flows from emitter 18 to collector 17 during one-half cycle of the alternating current applied to terminals 12 and 13. During the other half cycle, transistor 15 is biased in the reverse direction to block any current flow between terminals 12 and 13. Transistor 15 is biased to saturation by the bias circuit also coupled to terminals 12 and 13.

The bias circuit includes a transformer having a winding 21 connected in series with capacitor 24 across terminals 12 and 13. A second winding 22 connected to terminal 12 and magnetically coupled to the first winding 21 provides a potential to base 19, through resistor 25, which is greater than the potential applied to terminal 12. For example this increase in potential may be of the order of 1 volt. This increase in potential is sufficient to bias transistor 15 to saturation with the potential applied to terminals 12 and 13 being of the proper polarity.

Assume an alternating current signal is applied to terminals 12 and 13, with the alternating current signal applied to terminal 12 being positive with respect to that applied to terminal 13. The potential applied to base 19 is more positive than the potential applied to collector 17 or emitter 18 so that transistor 15 is reversed biased and no conduction takes place. When the polarity of the alternating current signal applied to terminals 12 and 13 is reversed, transistor 15 is biased to conduction. The negative potential on terminal 12 is added to the potential developed across winding 22 and the potential applied to base 19 is more negative than that applied to either collector 17 or emitter 18, so that transistor 15 is biased to saturation. With transistor 15 biased to saturation, the voltage drop between terminals 12 and 13 is established at a minimum value determined by the V $V_{CE(sat)}$ drop of the transistor instead of the $V_{BE}$ drop of the transistor.

Terminal 28 is connected between transformer winding 21 and capacitor 24. Since the circuit of FIG. 1 will act to clamp an alternating current signal applied thereto the charge developed on capacitor 24 furnishes information as to the average value of the alternating current signal and this information can be provided to other circuits as required.

Figure 2:
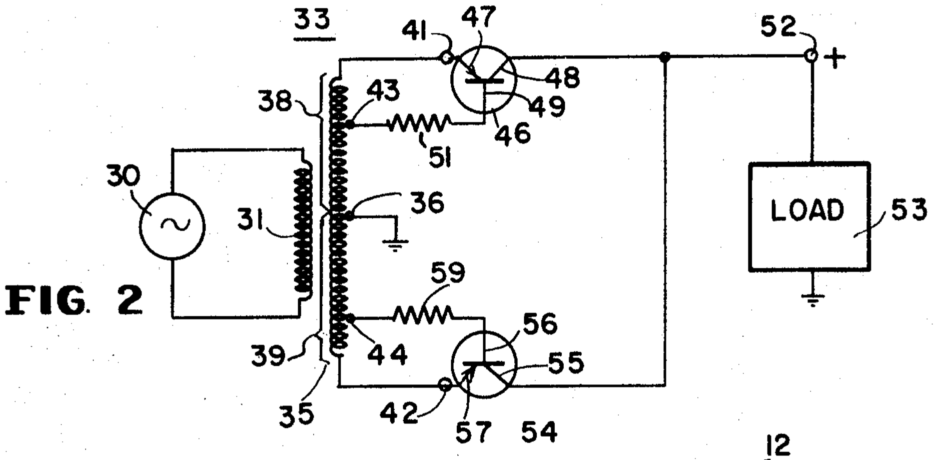
FIG. 2 is a rectifying circuit incorporating the rectifying element of FIG. 1.

In FIG. 2 a pair of the circuits of FIG. 1 are combined to form a full wave rectifier circuit having increased efficiency since the forward voltage drop across the transistor is less than the normal rectifier diode voltage drop. A source of alternating current 30 is coupled to the primary winding 31 of transformer 33. Secondary winding 35 is center tapped at point 36 forming a first section 38 and a second section 39. The first section has a terminal 41 at one end and the second section has a terminal 42 at one end. The other ends of the first and second sections are connected at the center tap 36. The first section 38 is tapped at terminal 43 and the second section 39 is tapped at terminal 44. Transistor 46 has emitter 47 connected to terminal 41 and collector 48 connected to output terminal 52. The center tap end of first transformer section 38 is coupled to collector 48 through load 53. The base 49 of transistor 46 is connected through current limiting resistor 51 to terminal 43. Transistor 54 is connected in a similar manner to the second section 39 of the secondary winding.

In operation, when terminal 41 is positive with respect to the center tap 36, terminal 42 is negative. With terminal 42 negative transistor 54 is biased off. With terminal 41 positive transistor 46 is biased to conduction and current is conducted to output terminal 52. Base 49 is connected to terminal 43 so that a bias voltage is developed between terminals 41 and 43 with terminal 41 being more positive than terminal 43. Terminal 43 is chosen so that the bias potential developed between terminals 41 and 43 is sufficient to bias the transistor 46 to a saturated condition. When the polarities of the output potentials at terminals 41 and 42 are reversed, transistor 54 conducts in a manner similar to transistor 46.

Figure 3:
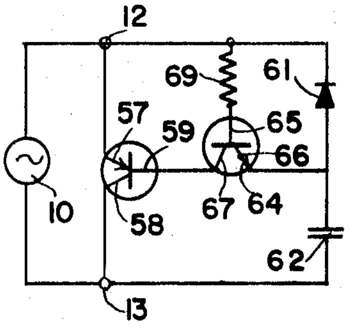
FIG. 3 is a second embodiment of the invention.

In FIG. 3 there is shown another embodiment of a bias circuit. Transistor 56 has collector 57 directly connected to terminal 12 and collector 58 directly connected to terminal 13. With transistor 56 biased to saturation the voltage drop across transistor 56 is at a minimum. A diode 61 and capacitor 62 are coupled in series between terminals 12 and 13. A second transistor 64 has collector 67 connected to base 59 of transistor 56 and emitter 66 connected to the junction of diode 61 and capacitor 62. A current limiting resistor 69 connects base 65 to terminal 12 and the other end of diode 61. Transistor 64 and transistor 56 are opposite polarity types. Diode 61 is poled opposite to the base 65, emitter 66 diode of transistor 64.

In operation, with a negative potential applied to terminal 12 and a positive potential on terminal 13, capacitor 62 charges through diode 61 so that there is a negative potential on emitter 66. However, the potential applied to base 65 is slightly more negative than the emitter 66 potential so that transistor 64 is biased to noconduction and therefore transistor 56 is also biased to conduction. When the polarity of the signal on terminals 12 and 13 reverses so that terminal 12 has a positive polarity signal and terminal 13 has a negative polarity signal, diode 61 is biased to nonconduction so that the charge on capacitor 62 cannot flow through diode 61. Since the base 65 is now positive with respect to emitter 66, transistor 64 is biased to conduction and a potential is applied from collector 67 to base 59 of transistor 56. Since the negative potential of terminal 13 is added to the negative potential appearing on emitter 66, the potential on base 59 of transistor 56 is more negative than the collector 58 potential so that transistor 56 is biased to saturation.

Figure 4:
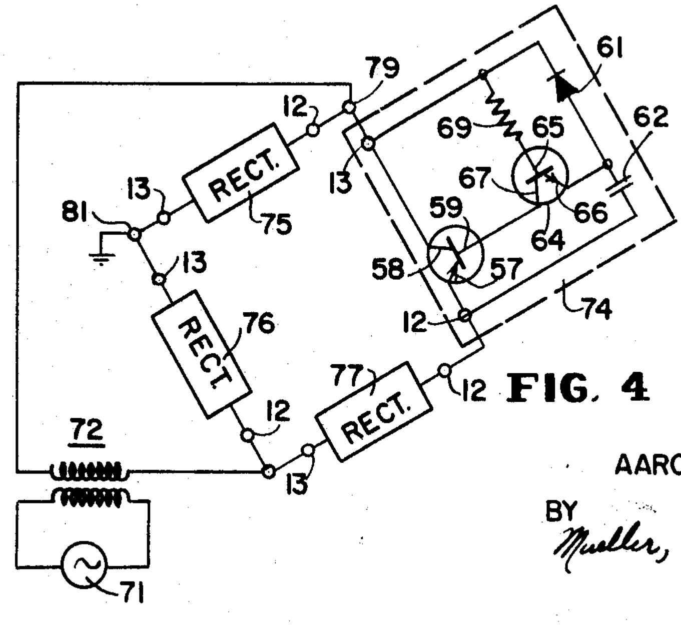
FIG. 4 is a rectifying circuit incorporating the rectifying element of FIG. 3.

In FIG. 4 there is shown a bridge rectifier circuit incorporating the rectifying circuit of this invention. The bridge consists of a plurality of rectifying circuits 74, 75, 76 and 77 connected to terminals 79, 80, 81, and 82. An alternating current supply from source 71 is connected through transformer 72 to bridge terminals 79 and 80. A direct current output signal is developed between bridge terminals 81 and 82.

Rectifier circuit 74 is shown in detail and is identical with the rectifier circuit of FIG. 3. Rectifier circuits 75, 76 and 77 are identical to rectifier circuit 74 and are connected as shown to provide the correct polarity for the bridge rectifier.

I claim:

1. A transistor rectifying circuit for an alternating current signal, including in combination, first and second terminals for receiving the alternating current signal, a first transistor having a collector electrode directly connected to said first terminal, an emitter electrode directly connected to said second terminal and a base electrode, bias circuit means directly connected between said first and second terminals and further coupled to said base electrode of said first transistor, said bias circuit means being responsive to the alternating current signal to develop a bias signal therefrom and apply the same to said base electrode, said bias signal being of greater magnitude than the alternating current signal at said collector and emitter electrodes during one-half cycle of the alternating current signal whereby said transistor is biased to saturation.

2. The transistor rectifying circuit of claim 1 wherein, said bias circuit means include a transformer having a first winding portion coupled between said first and second terminals and a second winding portion coupled to said base electrode.

3. The transistor rectifying circuit of claim 2 wherein, said transformer includes a terminal common to said first and second winding portion, said first winding portion includes a first transformer terminal and said second winding portion includes a second transformer terminal, said common transformer terminal being connected to said first terminal, capacitance means connecting said first transformer terminal to said second terminal, and resistance means connecting said second transformer terminal to said base electrode.

4. The transistor rectifying circuit of claim 1 wherein, said bias circuit means includes, capacitor means and diode means connected in series between said first and second terminals, a second transistor having an emitter electrode connected to the junction of said capacitor means and said diode means, a base electrode coupled to to the other side of said diode means and a collector electrode connected to said base electrode of said first transistor, said second transistor being of the polarity type opposite to that of said first transistor, said diode means being poled opposite to the base-emitter diode polarity of said second transistor, 5. A bridge rectifier circuit for an alternating current signal, including in combination, four bridge rectifier terminals, four transistor rectifying circuits each connected to pairs of said bridge rectifier circuit, each of said transistor rectifying circuits including first and second terminals, a first transistor having a collector electrode directly connected to said first terminal, an emitter electrode directly connected to said second terminal and a base electrode, bias circuit means including capacitor means and diode means connected in series between said first and second terminals, a second transistor having an emitter electrode connected to the junction of said capacitor means and said diode means, a base electrode coupled to the other side of said diode means and a collector electrode connected to said base electrode of said first transistor, said second transistor being of the polarity type opposite to that of said first transistor, said diode means being poled opposite to the base-emitter diode polarity of said second transistor.